(12) United States Patent
Sun et al.

(10) Patent No.: US 12,713,266 B2
(45) Date of Patent: Aug. 18, 2026

(54) SOUNDING REFERENCE SIGNAL (SRS) REFERENCE SIGNAL RECEIVED POWER (SRS-RSRP) REPORTING IN WIRELESS SYSTEMS

(71) Applicant: Apple Inc., Cupertino, CA (US)

(72) Inventors: Haitong Sun, Cupertino, CA (US); Dawei Zhang, Saratoga, CA (US); Wei Zeng, Saratoga, CA (US); Hong He, San Jose, CA (US); Oghenekome Oteri, San Diego, CA (US); Chunxuan Ye, San Diego, CA (US); Ankit Bhamri, Bad Nauheim (DE); Manasa Raghavan, Sunnyvale, CA (US); Seyed Ali Akbar Fakoorian, San Diego, CA (US)

(73) Assignee: Apple Inc., Cupertino, CA (US)

( * ) Notice: Subject to any disclaimer, the term of this patent is extended or adjusted under 35 U.S.C. 154(b) by 299 days.

(21) Appl. No.: 18/394,270

(22) Filed: Dec. 22, 2023

(65) Prior Publication Data

US 2024/0251271 A1 Jul. 25, 2024

Related U.S. Application Data

(60) Provisional application No. 63/439,885, filed on Jan. 19, 2023.

(51) Int. Cl.
*H04W 24/10* (2009.01)
*H04B 17/318* (2015.01)

(52) U.S. Cl.
CPC .......... *H04W 24/10* (2013.01); *H04B 17/328* (2023.05)

(58) Field of Classification Search
CPC ............................ H04W 24/10; H04B 17/328
See application file for complete search history.

(56) References Cited

U.S. PATENT DOCUMENTS

2020/0112419 A1* 4/2020 Bagheri ................ H04L 5/0057
2021/0328692 A1* 10/2021 Zhang .................. H04B 17/345
(Continued)

FOREIGN PATENT DOCUMENTS

EP 4 358 573 A1 4/2024
WO WO 2021/223089 A1 11/2021
WO WO 2022/250511 A1 12/2022

OTHER PUBLICATIONS

International Search Report and Written Opinion for Application No. PCT/US2024/012035, mailed May 15, 2024, 11 pages.
(Continued)

*Primary Examiner* — Ajay Cattungal
(74) *Attorney, Agent, or Firm* — Sterne, Kessler, Goldstein & Fox P.L.L.C.

(57) ABSTRACT

Some aspects relate to apparatuses and methods for a wireless system implementing mechanisms to transmit a measurement report using physical layer (L1) carrying a sounding reference signal (SRS) reference signal received power (SRS-RSRP) measurement to provide an indication of cross link interference (CLI) between a first user equipment (UE) and a second UE. The first UE can determine a channel state information (CSI) configuration received from the base station; and configure, based on the CSI configuration, a channel measurement resource (CMR) to include a SRS received from the second UE. The first UE can measure the SRS to obtain a SRS-RSRP measurement, generate a measurement report having the SRS-RSRP measurement, and transmit the measurement report to the base station using L1.

20 Claims, 4 Drawing Sheets

(56) References Cited

U.S. PATENT DOCUMENTS

| | | | | |
|---|---|---|---|---|
| 2022/0095144 | A1 | 3/2022 | Ren et al. | |
| 2022/0124660 | A1* | 4/2022 | Cheng | H04W 56/0045 |
| 2022/0312456 | A1* | 9/2022 | Guo | H04L 5/0053 |
| 2023/0156704 | A1* | 5/2023 | Wang | H04L 1/1896 370/329 |
| 2023/0361840 | A1* | 11/2023 | Santhappan | H04B 17/345 |
| 2024/0333570 | A1* | 10/2024 | Takeda | H04L 5/0032 |

OTHER PUBLICATIONS

3rd Generation Partnership Project, Technical Specification Group Radio Access Network, NR, "Physical layer procedures for data," 3GPP TS 38.214, V17.4.0, Dec. 2022, 231 pages.

* cited by examiner

SOUNDING REFERENCE SIGNAL (SRS) REFERENCE SIGNAL RECEIVED POWER (SRS-RSRP) REPORTING IN WIRELESS SYSTEMS

RELATED APPLICATIONS

This application claims benefit of U.S. Provisional Patent Application No. 63/439,885 filed Jan. 19, 2023, the content of which is herein incorporated by references in its entirety.

BACKGROUND

Field

The described aspects generally relate to wireless communication, including sounding reference signal (SRS) reference signal received power (SRS-RSRP) reporting in wireless systems.

Related Art

A wireless communication system can include a fifth generation (5G) system, a New Radio (NR) system, a long term evolution (LTE) system, a non-terrestrial wireless network (NTN), a combination thereof, or some other wireless systems. In addition, a wireless communication system can support a wide range of use cases such as enhanced mobile broad band (eMBB), massive machine type communications (mMTC), ultra-reliable and low-latency communications (URLLC), enhanced vehicle to anything communications (eV2X), among others. A wireless system may include multiple user equipment (UE) in communication with a base station or with each other. Interferences between multiple UEs in a wireless system can degrade the performance of the wireless system.

SUMMARY

Some aspects of this disclosure relate to apparatuses and methods for implementing mechanisms to transmit a measurement report using physical layer (L1) carrying a sounding reference signal (SRS) reference signal received power (SRS-RSRP) measurement to provide an indication of cross link interference (CLI) between a first user equipment (UE) and a second UE in a wireless system. The measurement report transmitted using L1 can be more efficient compared to measurement report carried by higher level layers such as by Radio Resource Control (RRC) message at RRC layer.

Some aspects of this disclosure relate to a first UE of a wireless system in communication with a base station and a second UE. The first UE can include a transceiver, and a processor communicatively coupled to the transceiver. The transceiver can be configured to communicate with the base station and the second UE.

According to some aspects, the processor of the first UE can determine a channel state information (CSI) configuration received from the base station; and configure, based on the CSI configuration, a channel measurement resource (CMR) to include a Sounding Reference Signal (SRS) received from the second UE. The processor can further measure the SRS to obtain a SRS-reference signal received power (SRS-RSRP) measurement, generate a measurement report having the SRS-RSRP measurement to provide an indication of cross link interference (CLI) between the first UE and the second UE, and transmit the measurement report to the base station using L1. In some embodiments, the processor can further report a UE capability of the first UE to the base station, where the CSI configuration is determined by the base station based on the UE capability. The UE capability can include a number of CSI Processing Unit (CPU) that the first UE supports.

In some embodiments, to measure the SRS to obtain the SRS-RSRP measurement, the processor can perform measurement on a latest SRS among a plurality of SRS that is not later than a CSI reference resource. The processor can transmit the measurement report in an aperiodic manner, in a periodic manner, or in a semi-persistent manner. In some embodiments, the measurement report can be a standalone report without carrying other reference measurement including a RI (Rank Indicator), a Channel Quality Information (CQI), a Precoding Matrix Indicator (PMI), a Layer Indicator (LI), a CSI-RS Resource Indicator (CRI), or a synchronization signals (SS) and physical broadcast channel (PBCH) Resource Block Indicator (SSBRI).

According to some aspects, the CSI configuration can include a subcarrier spacing (SCS) of the SRS and a serving cell identifier for a cell where the first UE and the second UE are located at. The CSI configuration can include an adjustment of reception timing for measuring the SRS. The CSI configuration can further include a priority among the measurement report, a link adaption (LA)-CSI report, or a beam measurement (BM)-CSI report. The CSI configuration can further include a SRS-RSRP processing time by the first UE to measure the SRS to obtain the SRS-RSRP measurement and to transmit the measurement report using L1 to the base station. The CSI configuration can be received from the base station by a Radio Resource Control (RRC) message, a medium access control-control elements (MAC-CE), or Downlink Control Information (DCI).

In some embodiments, the CSI configuration can include a CSI-ReportConfig parameter and/or a CSI-ResourceConfig parameter, where one or multiple of SRS-ResourceSets can be configured by the CSI-ResourceConfig parameter. In some embodiments, the CSI configuration can include a SRS resource set index, and the processor can measure the SRS based on the SRS resource set index to obtain the SRS-RSRP measurement, and transmit the measurement report using L1 to the base station, where the measurement report is an aperiodic measurement report, in a periodic measurement report, or in a semi-persistent measurement report. In some embodiments, the CMR can be configured to include a single SRS-resource or a single SRS resource set by the CSI-ResourceConfig parameter included in the CSI configuration.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
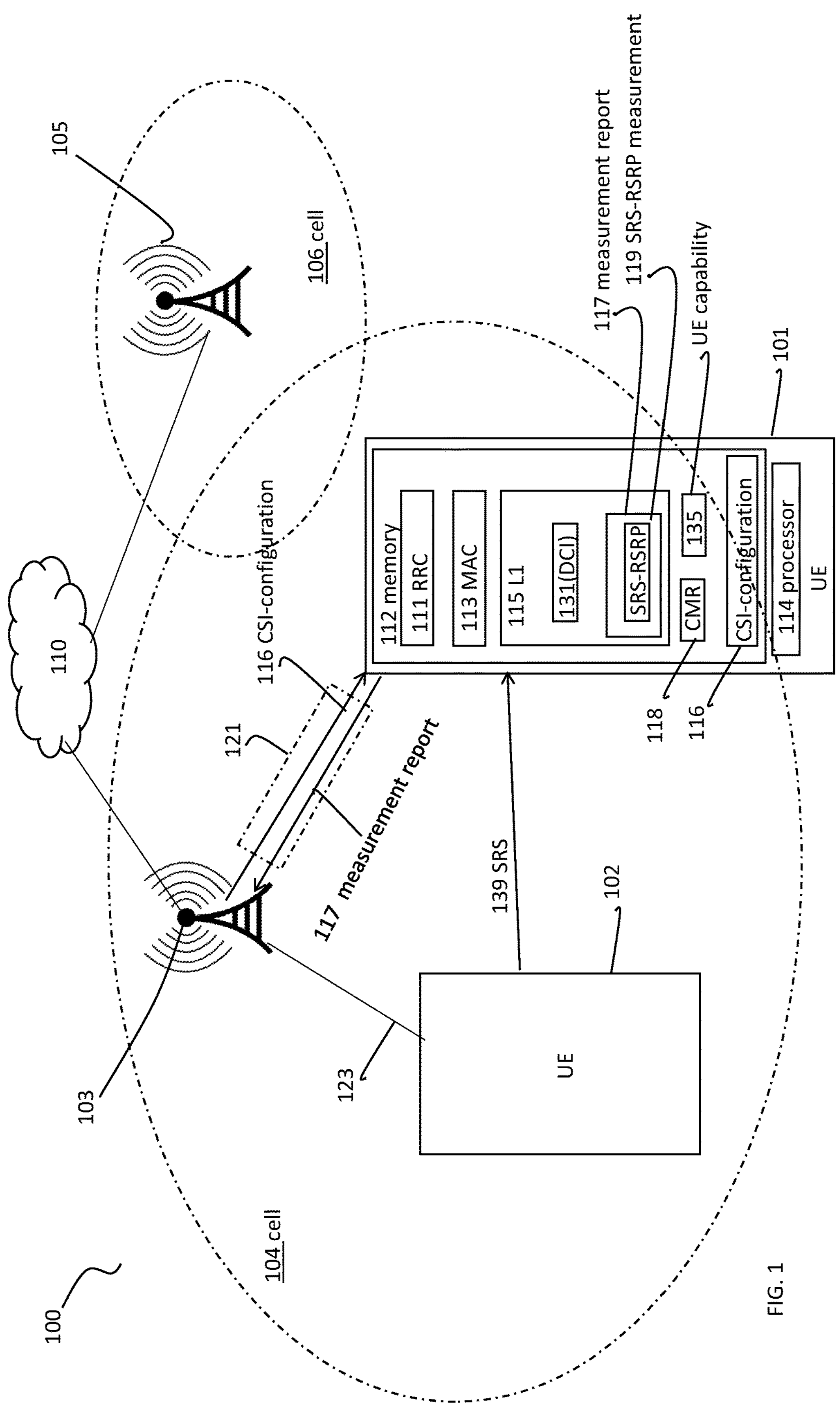
FIG. 1 illustrates a wireless system to transmit a measurement report by a user equipment (UE) using physical layer (L1) carrying a sounding reference signal (SRS) reference signal received power (SRS-RSRP) measurement, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

In a wireless system, a user equipment (UE) may measure the signals, such as serving cell signals, neighboring cell signals and other signals to provide information about the channel conditions and interferences. A wireless system can include a fifth generation (5G) system, a New Radio (NR) system, a long term evolution (LTE) system, a non-terrestrial wireless network (NTN), a combination thereof, or some other wireless systems.

In some wireless systems, a device, either a base station or a UE, may not perform simultaneously in the same frequency both downlink (DL) and uplink (UL) operations, e.g., transmission and reception, due to the interference between transmission and reception. Some wireless system may support paired spectrum, such as Frequency Division Duplex (FDD) spectrum, so that both the full duplex and half duplex operations can be performed. Some wireless systems may support only unpaired spectrum such as Time Division Duplex (TDD) spectrum, so that only half duplex operations are performed. Some wireless system may support Subband Full Duplex (SBFD) in unpaired TDD spectrum to allow a base station to receive UL from a first UE and transmit DL to a second UE simultaneously, with certain gap between DL and UL operation in frequency.

In some wireless systems, such as a wireless system supporting SBFD, cross link interference (CLI) may exist between a first UE and a second UE in communication with a base station in a cell. In addition, network (NW) to network (NW) CLI may exist as well. For UE to UE CLI management, some wireless system may support sounding reference signal (SRS) reference signal received power (SRS-RSRP) measurement as an indication of CLI. Additionally and alternatively, a CLI-Received Signal Strength Indicator (RSSI) measurement may be used as an indication of CLI. However, SRS-RSRP measurement or RSSI measurement may only be transmitted by higher level messages such as by Radio Resource Control (RRC) message at RRC layer.

In some embodiments, to improve CLI management accuracy and efficiency, mechanisms are provided to transmit a measurement report using physical layer (L1) carrying a SRS-RSRP measurement to provide an indication of CLI between a first UE and a second UE in a wireless system. Transmitting a measurement report using L1 carrying a SRS-RSRP measurement can be more efficient than carrying the SRS-RSRP measurement using higher level messages such as by RRC messages.

In some embodiments, a channel state information (CSI) configuration can be received from the base station by a first UE, where the CSI configuration may be determined based on a UE capability of the first UE, which can include a number of CSI Processing Unit (CPU) that the first UE supports. Based on the CSI configuration, the network can configure the first UE with a channel measurement resource (CMR) to include a SRS received from the second UE. The first UE can further measure the SRS to obtain a SRS-RSRP measurement, generate a measurement report having the SRS-RSRP measurement to provide an indication of CLI between the first UE and the second UE, and transmit the measurement report to the base station using L1. In some embodiments, the measurement report can be a standalone report without carrying other reference measurement including a RI (Rank Indicator), a Channel Quality Information (CQI), a Precoding Matrix Indicator (PMI), a Layer Indicator (LI), a CSI-RS Resource Indicator (CRI), or a synchronization signals (SS) and physical broadcast channel (PBCH) Resource Block Indicator (SSBRI).

FIG. 1 illustrates a wireless system 100 to transmit a measurement report 117 by a UE 101 using L1 carrying a SRS-RSRP measurement 119, according to some aspects of the disclosure. UE 101 is a first UE, and can communicate with a second UE 102 and a base station 103 within a cell 104. Wireless system 100 is provided for the purpose of illustration only and does not limit the disclosed aspects. Wireless system 100 can include, but is not limited to, UE 101, UE 102, base station 103, and a base station 105, all communicatively coupled to a core network 110. UE 101 communicates with base station 103 over a communication link 121, UE 102 communicates with base station 103 over a communication link 123.

In some examples, wireless system 100 can be a wireless system that includes one or more of a NR system, a LTE system, a 5G system, or some other wireless system. There can be other network entities, e.g., network controller, a relay station, not shown. Wireless system 100 can support a wide range of use cases such as enhanced mobile broad band (eMBB), massive machine type communications (mMTC), ultra-reliable and low-latency communications (URLLC), and enhanced vehicle to anything communications (eV2X).

According to some aspects, base station 103 and base station 105 can be a fixed station or a mobile station. Base station 103 and base station 105 can also be called other names, such as a base transceiver system (BTS), an access point (AP), a transmission/reception point (TRP), an evolved NodeB (eNB), a next generation node B (gNB), a 5G node B (NB), or some other equivalent terminology. In some examples, base station 103 can be a gNB, while base station 105 can be a gNB or an eNB. In some examples, base station 103 and base station 105 can be interconnected to one another and/or to other base station or network nodes in a network through various types of backhaul interfaces such as a direct physical connection, a virtual network, and/or the like, not shown.

According to some aspects, UE 101, or UE 102, can be stationary or mobile. UE 101 or UE 102 can be a cellular phone (e.g., a smart phone), a personal digital assistant (PDA), a wireless modem, a wireless communication device, a handheld device, a laptop, a desktop, a cordless phone, a wireless local loop station, a wireless sensor, a tablet, a camera, a video surveillance camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IOT) device, a machine-type communication (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, base station 103 and base station 105 can be communicatively coupled to core network 110. Base station 103 can serve a cell 104, base station 105 can serve a cell 106. In some other embodiments, cell 104 can overlap partially with cell 106. Cell 104 and cell 106 can be a macro cell, a pico cell, a femto cell, and/or another type of cell. In comparison, a macro cell can cover a relatively large geographic area, e.g., several kilometers in radius, a femto cell can cover a relatively small geographic area, e.g., a home, while a pico cell covers an area smaller than the area covered by a macro cell but larger than the area covered by a femto cell. For example, cell 104 can be a macro cell, while cell 106 can be a pico cell or a femto cell. In addition, cell 104 can be a pico cell while cell 106 can be a femto cell. In some examples, the geographic area of a cell can move according to the location of a mobile base station.

Figure 2:
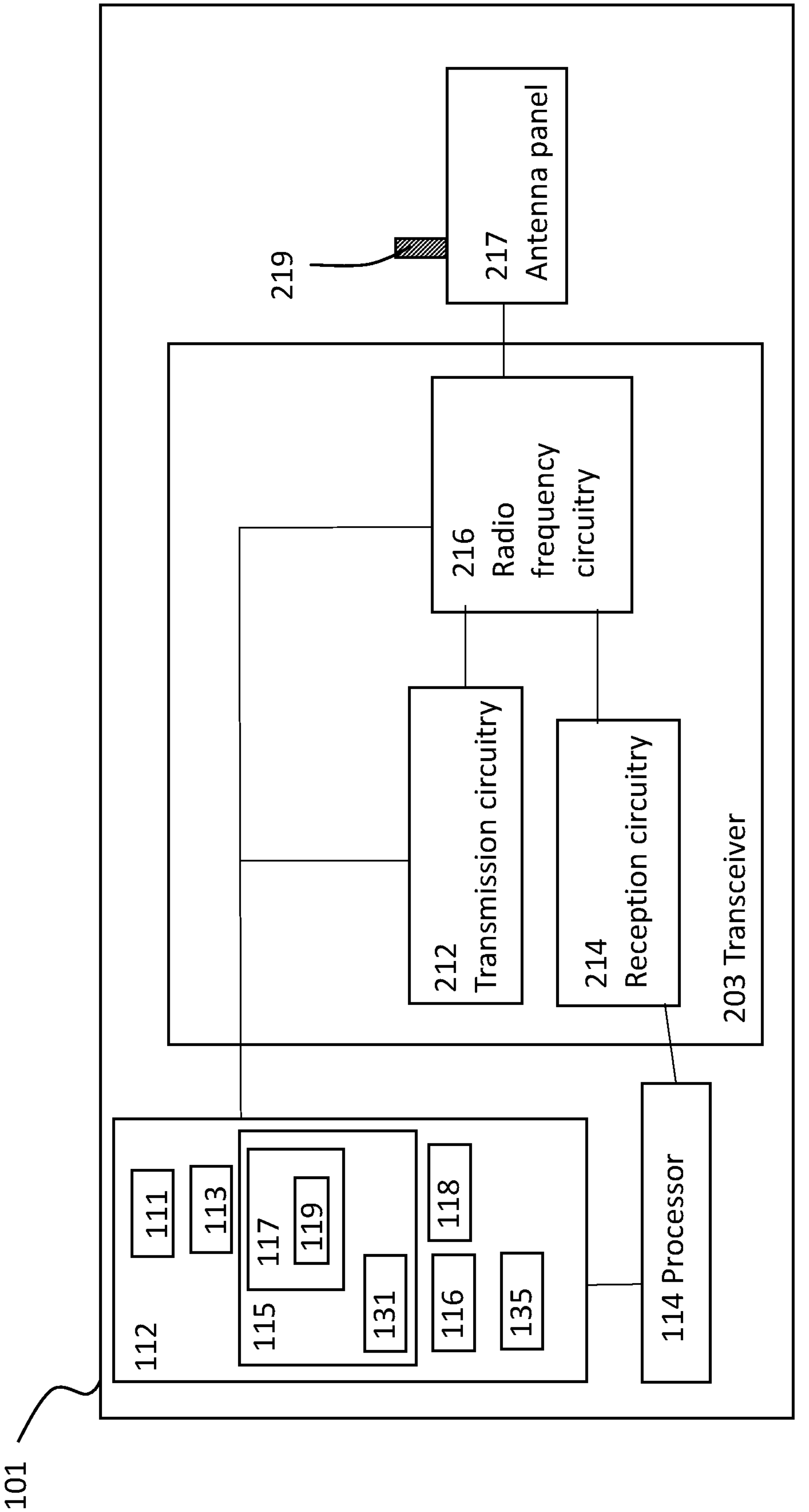
FIG. 2 illustrates a block diagram of a UE to perform functions described herein, according to some aspects of the disclosure.

According to some aspects, UE 101 can include a memory 112, and a processor 114 communicatively coupled to the memory, and a transceiver, as shown in FIG. 1 and further shown in FIG. 2. Memory 112 can be configured to store various data and operations for communication protocols including various layers, such as RRC layer 111, medium access control (MAC) layer 113, and physical layer (L1) 115.

In some embodiments, processor 114 can be configured to determine a CSI configuration 116 received from base station 103. CSI configuration 116 can be received from base station 103 by a RRC message, a MAC-control elements (MAC-CE), or Downlink Control Information (DCI) 131 using L1. In addition, processor 114 can configure, based on CSI configuration 116, a channel measurement resource (CMR) 118 to include one or multiple SRS(s) 139 received from a second UE, e.g., UE 102. Processor 114 can further measure SRS 139 from UE 102 to obtain SRS-RSRP measurement 119, generate measurement report 117 having the SRS-RSRP measurement 119 to provide an indication of CLI between UE 101 and UE 102, and transmit measurement report 117 to base station 103 using L1. In some embodiments, processor 104 can further report a UE capability 135 of UE 101 to base station 103, where CSI configuration 116 can be determined by base station 103 based on UE capability 135. UE capability 135 can include a number of CSI Processing Units (CPU) that UE 101 supports.

In some embodiments, to measure SRS 139 transmitted from UE 102 to obtain SRS-RSRP measurement 119, processor 114 can perform measurement on a latest SRS among a plurality of SRS that is not later than a CSI reference resource. Processor 114 can transmit measurement report 117 in an aperiodic manner, in a periodic manner, or in a semi-persistent manner. In some embodiments, measurement report 117 can be a standalone report without carrying other reference measurement including a RI (Rank Indicator), a Channel Quality Information (CQI), a Precoding Matrix Indicator (PMI), a Layer Indicator (LI), a CSI-RS Resource Indicator (CRI), or a synchronization signals (SS) and physical broadcast channel (PBCH) Resource Block Indicator (SSBRI).

According to some aspects, CSI configuration 116 can include a subcarrier spacing (SCS) of SRS 139 and a serving cell identifier for cell 104 that is serving UE 101 and 102, and is representative of the location UE 101 and UE 102. CSI configuration 116 can include an adjustment of reception timing for measuring SRS 139. CSI configuration 116 can further include a priority among the measurement report 117, a link adaption (LA)-CSI report, or a beam measurement (BM)-CSI report. The priority of SRS-RSRP report, in comparison to LA-CSI report and BM-CSI report can also be pre-determined and hardcoded in the specification, for example, SRS-RSRP report has the same priority as BM-CSI or LA-CSI. CSI configuration 116 can further include an SRS-RSRP processing time by UE 101 to measure SRS 139 to obtain SRS-RSRP measurement 119 and to transmit measurement report 117 using L1 to base station 103. The SRS-RSRP processing time can also be reported as UE capability, or pre-determined and hardcoded in the specification.

In some embodiments, CSI configuration 116 can include a CSI-ReportConfig parameter or a CSI-ResourceConfig parameter, where one or multiple of SRS-ResourceSets can be configured by the CSI-ResourceConfig parameter. In some embodiments, CSI configuration 116 can include a SRS resource set index, and processor 114 can measure SRS 139 based on the SRS resource set index to obtain SRS-RSRP measurement 119, and transmit measurement report 117 using L1 to base station 103, where measurement report 117 can be an aperiodic measurement report. In some embodiments, CMR 118 can be configured to include a single SRS-resource or a single SRS resource set by the CSI-ResourceConfig parameter included in CSI configuration 116.

FIG. 2 illustrates a block diagram of UE 101, having antenna panel 217 including one or more antenna elements, e.g., an antenna element 219 coupled to transceiver 203 and controlled by processor 114. In detail, transceiver 203 can include radio frequency (RF) circuitry 216, baseband transmission circuitry 212, and baseband reception circuitry 214. RF circuitry 216 can include multiple parallel RF chains for one or more of transmit or receive functions, each connected to one or more antenna elements of the antenna panel. Transceiver 203, via antenna panel 217, enables wireless communication for UE 101 with base station 103 and UE 102. In addition, processor 114 can be communicatively coupled to memory 112, which is further coupled to transceiver 203.

In some examples, RF circuitry 216 is used by UE 101 to perform measurements of reference signals, such as measuring SRS 139 to obtain SRS-RSRP measurement 119, and to receive CSI configuration 116. Memory 112 can store various data and operations such as RRC layer 111, MAC layer 113, L1 115, measurement report 117 containing SRS-RSRP measurement 119, UE capability 135, CSI configuration 116, CMR 118, DCI 131, and other data. Memory 112 can include instructions, that when executed by processor 114 perform the functions described herein, including the measurement report functions described herein. Alternatively, processor 114 can be "hard-coded" to perform the functions described herein, including the measurement report functions described herein.

Figure 3:
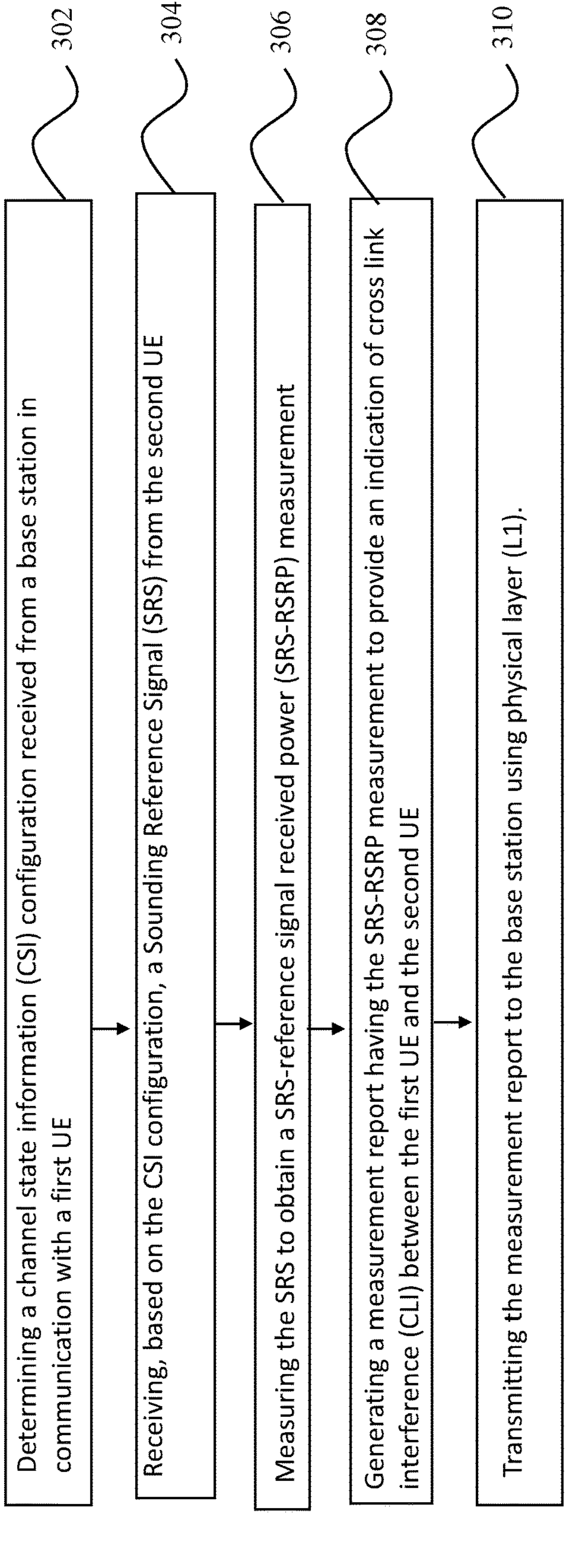
FIG. 3 illustrates an example process performed by a UE to transmit a measurement report using L1 carrying a SRS-RSRP measurement, according to some aspects of the disclosure.

FIG. 3 illustrates an example process 300 performed by a UE to transmit a measurement report 117 using L1 carrying a SRS-RSRP measurement 119, according to some aspects of the disclosure. Process 300 can be performed by UE 101 as shown in FIGS. 1-2. For example, processor 114 can perform, or cause UE 101 to perform, process 300.

At 302, UE 101 can determine CSI configuration 116 received from base station 103 in communication with UE 101.

In some embodiments, CSI report framework can include at least two parts. One is for CSI configuration 116 and the other one is for triggering states which are associated with a specific CSI configuration. There can be various CSI related reference signals (RS), such as non-zero power (NZP)-CSI-RS resource, zero power (ZP)-CSI-RS resource, interference measurement (IM) Resource. CSI configuration 116 can include a parameter ResourceSet to define individual resources for the CSI signal measurement, a CSI ResourceConfig parameter to specify what type of reference signal(s) are to be transmitted for measurement purposes. CSI-ResourceConfig can also configure the types of the transmission (periodic, aperiodic, semi-persistent). CSI-ReportConfig can specify which of CSI ResourceConfig to be used for the measurement.

In some embodiments, SRS-RSRP measurement 119 can be configured by CSI-ReportConfig contained within CSI configuration 116. For reference signals, SRS-RSRP can be measured by UE 101 on SRS 139 transmitted by another UE, UE 102. In some embodiments, CMR 118 can be configured in CSI-ReportConfig contained within CSI configuration 116. In detail, CMR 118 can be configured by resourcesForChannelMeasurement in CSI-ReportConfig. For SRS-RSRP measurement 119, SRS 139 can be configured as CMR 118 in CSI-ReportConfig. In some embodiments, only SSB/CSI-RS can be configured as CMR 118 in CSI-ReportConfig.

In some embodiments, to configure SRS 139 as CMR 118 for L1 SRS-RSRP reporting, one or multiple of SRS-ResourceSet in CSI-ResourceConfig can be configured:

```
CSI-ResourceConfig ::= SEQUENCE {
csi-ResourceConfigId CSI-ResourceConfigId,
csi-RS-ResourceSetList CHOICE {
  nzp-CSI-RS-SSB SEQUENCE {
  nzp-CSI-RS-ResourceSetList SEQUENCE (SIZE (1..maxNrofNZP-CSI-RS-
ResourceSetsPerConfig)) OF NZP-CSI-RS- ResourceSetId
  OPTIONAL, -- Need R
  csi-SSB-ResourceSetList SEQUENCE (SIZE (1..maxNrofCSI-SSB-
ResourceSetsPerConfig)) OF CSI-SSB-ResourceSetId OPTIONAL -- Need R
  },
  csi-IM-ResourceSetList SEQUENCE (SIZE (1..maxNrofCSI-IM-
ResourceSetsPerConfig)) OF CSI-IM-ResourceSetId
  SRS-ResourceSetList SEQUENCE (SIZE (1..maxNrofSRS-
ResourceSetsPerConfig)) OF SRS-ResourceSetId OPTIONAL, -- Need R
  },
  bwp-Id BWP-Id,
  resourceType ENUMERATED { aperiodic, semiPersistent, periodic },
  ...
}
```

In some embodiments, in addition, one or more parameters can be configured, such as the SCS of SRS 139, or the Serving cell ID for cell 104.

In some embodiments, when SRS 139 is configured as CMR 118 for L1 SRS-RSRP reporting in CSI-ResourceConfig, for aperiodic SRS-RSRP report, additional parameter, such as SRS resource set index for the measurement, and the qcl-info for SRS reception, can be configured:

```
CSI-AssociatedReportConfigInfo ::= SEQUENCE { reportConfigId CSI-ReportConfigId,
resourcesForChannel CHOICE {
  nzp-CSI-RS SEQUENCE {
  resourceSet INTEGER (1..maxNrofNZP-CSI-RS-ResourceSetsPerConfig),
  qcl-info SEQUENCE (SIZE(1..maxNrofAP-CSI-RS-ResourcesPerSet)) OF TCI-
StateId OPTIONAL -- Cond Aperiodic
  },
  SRS SEQUENCE {
  resourceSet INTEGER (1..maxNrofSRS-ResourceSetsPerConfig),
  qcl-info SEQUENCE (SIZE(1..maxNrofAP-SRS-ResourcesPerSet)) OF TCI-
StateId OPTIONAL -- Cond Aperiodic
  },
  csi-SSB-ResourceSet INTEGER (1..maxNrofCSI-SSB-ResourceSetsPerConfig)
}.
```

In some embodiments, when SRS 139 is configured as CMR 118 for L1 SRS-RSRP reporting in CSI-ResourceConfig, there can some restrictions. For example, only single SRS-Resource can be configured as CMR 118; or only single SRS-ResourceSet can be configured as CMR 118.

In some embodiments, when SRS 139 is configured as CMR 118 for L1 SRS-RSRP reporting in CSI-ResourceConfig, there can be various configurations for parameter timeRestrictionForChannelMeasurements. In some embodiments, timeRestrictionForChannelMeasurements can be ignored. UE 101 can always assume timeRestrictionForChannelMeasurements="configure", so that UE 101 can measure and report only the latest SRS no later than the CSI reference resource. In some other embodiments, the parameter timeRestrictionForChannelMeasurements can be set to "notConfigured". UE 101 can measure and report based on multiple SRS no later than the CSI reference resource. In some embodiments, the filtering or average can be up to UE implementation. In some other embodiments, the filtering or average can be further configured by the network or defined in the specification.

In some embodiments, for the parameter reportQuantity in CSI-ReportConfig, a new entry of "SRS-RSRP" can be introduced as a candidate value for reportQuantity. In some embodiments, an existing parameter "L1-RSRP" can be reused for reportQuantity. CMR 118 can use SRS 139 instead of CSI-RS or SSB.

In some embodiments, for the parameter reportQuantity in CSI-ReportConfig, measurement report 117 can carry SRS-RSRP measurement 119 as a standalone report. Accordingly, no other report quantity is reported together with SRS-RSRP measurement 119, including RI/CQI/PMI/LI/CRI/SSBRI. In some embodiments, SRS-RSRP measurement 119 can be reported together with another report quantity. For example, SRS index can be reported, which is the index of SRS resource that UE 101 measures the strongest or the weakest RSRP. Base station 103 can further configure the adjustment of reception timing for SRS measurement. The configuration can be done in RRC/MAC-CE/DCI.

At 304, UE 101 can receive, based on CSI configuration 116, SRS 139 from UE 102 in communication with UE 101. In some embodiments, SRS 139 is included in CMR 118.

At 306, UE 101 can measure SRS 139 based on the CSI configuration 116 to obtain SRS-RSRP measurement 119.

At 308, UE 101 can generate measurement report 117 having SRS-RSRP measurement 119 to provide an indication of CLI between UE 101 and UE 102.

In some embodiments, in generating measurement report 117, UE 101 may determine a priority among measurement report 117, and other CSI reports such as a link adaption (LA)-CSI report, or a BM-CSI report, based on CSI configuration 116. When SRS-RSRP measurement 119 is reported in L1, compared to the other possible L1 CSI reports, the priority of SRS-RSRP report can be lower than LA-CSI; the same as LA-CSI; higher than LA-CSI; lower than BM-CSI, the same as BM-CSI; or higher than BM-CSI. In some embodiments, there can be two types of CSI reports: (1) BM-CSI that can include L1-RSRP/L1-SINR report, and (2) LA-CSI report that can include all other reports, where BM-CSI report can have higher priority compared to LA-CSI report. In some embodiments, at a high level, SRS-RSRP report 119 can have the same priority as one of the existing CSI reports, either BM-CSI or LA-CSI. Additionally and alternatively, SRS-RSRP report 119 can have different priority from the existing CSI report.

In some embodiments, for periodic and semi-persistent SRS-RSRP report, the minimum SRS-RSRP processing time can be 4 ms when single SRS-Resource is configured for measurement, or 5 ms when more than 1 SRS-Resource are configured for measurement. The SRS-RSRP processing time can be defined as the duration from the end of the last SRS for measurement and the beginning of the SRS-RSRP report.

In some embodiments, for aperiodic SRS-RSRP report, in terms of low latency report, which may be defined by Table 5.4-1 in the standard document TS38.214, UE 101 may not support low latency aperiodic SRS-RSRP report. In some embodiments, UE 101 can support low latency aperiodic SRS-RSRP report under one or multiple of the following condition, CSI can be triggered without a PUSCH with either transport block or HARQ-ACK or both, and L=0 CPUs are occupied. Accordingly, aperiodic SRS-RSRP report needs to meet the Z and Z' timeline as defined by Table 5.4-1 in TS38.214 when low latency aperiodic SRS-RSRP is configured.

In some embodiments, for aperiodic SRS-RSRP report, in terms of regular latency report, which may be defined by Table 5.4-2 in TS38.214, Z1 and Z1' can be used. In some other embodiments, new Z and Z' can be defined in the specification, or reported by the UE capability in RRC, which can be different from the existing Z1 and Z1' defined in TS38.214.

At 310, UE 101 can transmit measurement report 117 to base station 103 using L1.

In some embodiments, processor 104 can further report a UE capability 135 of UE 101 to base station 103, where CSI configuration 116 can be determined by base station 103 based on UE capability 135. UE capability 135 can include a number of CSI Processing Units (CPUs) that UE 101 supports.

In some embodiments, the number of CPUs that UE 101 can support can be indicated by the UE capability, and the UE 101 can include the existing CPU including the CSI report based on CSI-RS and SSB. Additionally and alternatively, UE 101 can separately report the CPU for SRS-RSRP report.

In some embodiments, the number of CPUs that UE 101 can support can be indicated by the UE capability, and for each CSI report, the occupied CPU can be the number of SRS-Resources configured as CMR. Additionally and alternatively, for each CSI report, the occupied CPU can be assumed to be 1. Furthermore, for each CSI report, the occupied CPU can be further reported by the UE capability. For a different number of SRSs configured as CMR, the UE 101 can report a different number of occupied CPU.

In some embodiments, for L1 SRS-RSRP report, for the number of active RSs that UE 101 can process, UE 101 can consider SRS as the existing active CSI-RS, such that SRS can be configured in the same way as CSI-RS. Additionally and alternatively, UE 101 can separately report the number of active RSs for SRS-RSRP report.

In some embodiments, for L1 SRS-RSRP report, for the number of active RSs that UE can process, each SRS-Resource can be counted as active RS in the slot it is transmitted. Additionally and alternatively, each SRS-Resource can also be counted as active RS even in the slot it is not transmitted. For aperiodic SRS, it is counted as active RS starting from the end of the PDCCH containing the request and ending at the end of the scheduled PUSCH containing the report. For semi-persistent SRS, it is counted as active RS starting from the end of when the activation command is applied, and ending at the end of when the deactivation command is applied. For periodic SRS, it is counted as active RS starting when the periodic CSI-RS is configured by higher layer signaling, and ending when the periodic.

Figure 4:
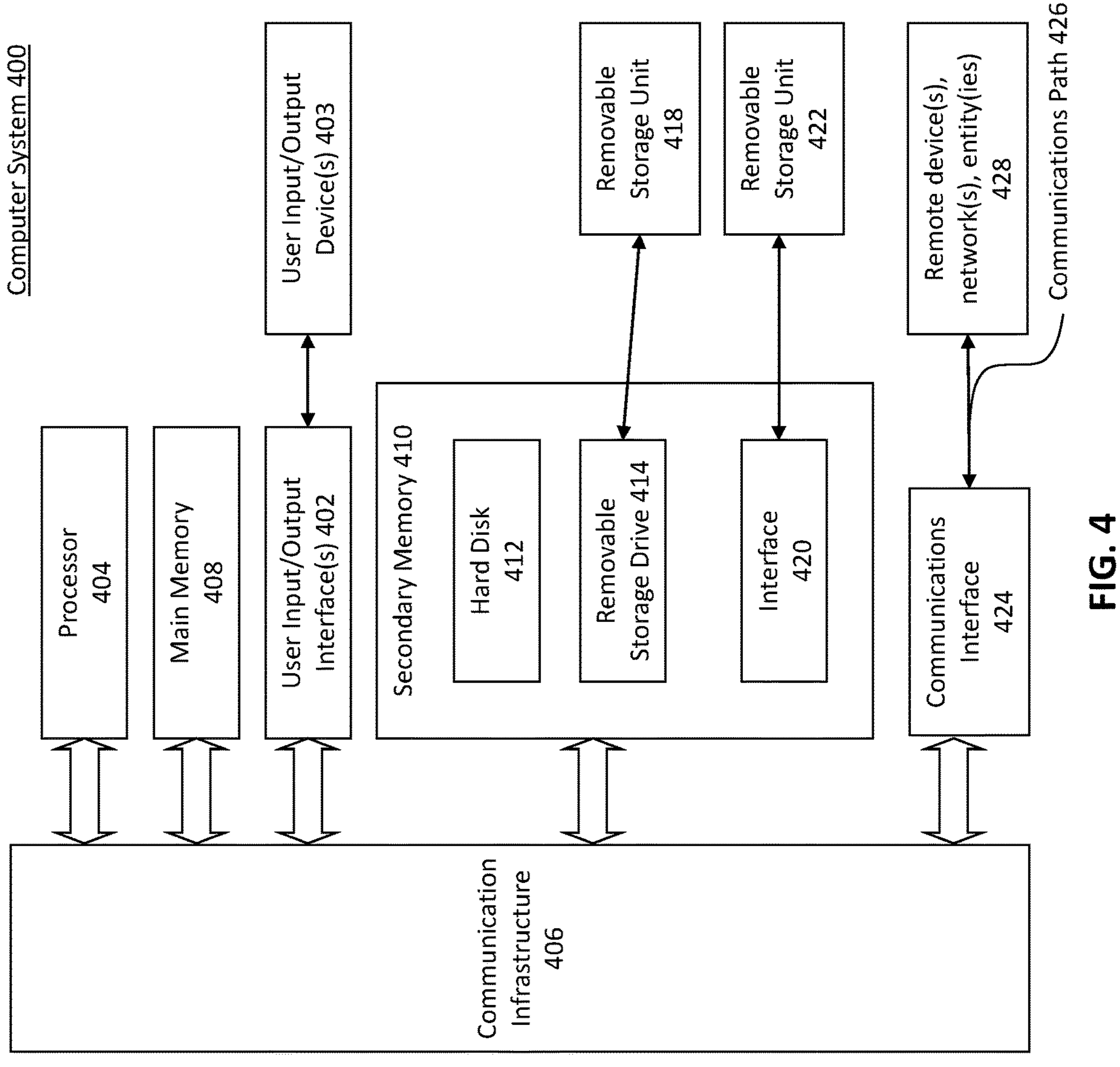
FIG. 4 is an example computer system for implementing some aspects or portion(s) thereof of the disclosure provided herein.

Various aspects can be implemented, for example, using one or more computer systems, such as computer system 400 shown in FIG. 4. Computer system 400 can be any computer capable of performing the functions described herein such as UE 101, UE 102, or base station 103 as shown in FIG. 1 and FIG. 2, for operations described for UE 101 or process 300 as shown in FIG. 3. Computer system 400 includes one or more processors (also called central processing units, or CPUs), such as a processor 404. Processor 404 is connected to a communication infrastructure 406 (e.g., a bus). Computer system 400 also includes user input/output device(s) 403, such as monitors, keyboards, pointing devices, etc., that communicate with communication infrastructure 406 through user input/output interface(s) 402. Computer system 400 also includes a main or primary memory 408, such as random access memory (RAM). Main memory 408 may include one or more levels of cache. Main memory 408 has stored therein control logic (e.g., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to some aspects, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 408, the removable storage unit 418, the removable storage unit 422 can store instructions that, when executed by processor 404, cause processor 404 to perform operations for a UE or a base station, e.g., UE 101, UE 102, or base station 103 as shown in FIG. 1 and FIG. 2, for operations described for UE 101 or process 300 as shown in FIG. 3.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426. Operations of the communication interface 424 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 400, main memory 408, secondary memory 410 and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 4. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to “one embodiment,” “an embodiment,” “an example embodiment,” or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

For one or more embodiments or examples, at least one of the components set forth in one or more of the preceding figures may be configured to perform one or more operations, techniques, processes, and/or methods as set forth in the example section below. For example, circuitry associated with a thread device, routers, network element, etc. as described above in connection with one or more of the preceding figures may be configured to operate in accordance with one or more of the examples set forth below in the example section.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A first user equipment (UE), comprising:

a transceiver configured to enable wireless communication with a base station and with a second UE in a wireless system; and a processor communicatively coupled to the transceiver and configured to:

determine a channel state information (CSI) configuration received from the base station, wherein the CSI configuration includes a CSI-ReportConfig parameter configuring a channel measurement resource (CMR) indicating a Sounding Reference Signal (SRS);

receive, based on the CSI configuration, the SRS from the second UE;

measure the SRS to determine an SRS-reference signal received power (SRS-RSRP) measurement;

generate a measurement report having the SRS-RSRP measurement to provide an indication of cross link interference (CLI) between the first UE and the second UE; and transmit the measurement report to the base station using physical layer (L1).

2. The first UE of claim 1, wherein to transmit the measurement report using L1, the processor is configured to transmit the measurement report in an aperiodic manner, in a periodic manner, or in a semi-persistent manner.

3. The first UE of claim 1, wherein the CSI configuration further includes a subcarrier spacing (SCS) of the SRS and a serving cell identifier of a serving cell that supports the first UE and the second UE.

4. The first UE of claim 1, wherein the CSI configuration includes the CSI-ReportConfig parameter or a CSI-ResourceConfig parameter, and wherein one or multiple of SRS-ResourceSets can be configured by the CSI-ResourceConfig parameter.

5. The first UE of claim 4, wherein the CSI configuration further includes a SRS resource set index, and the processor is further configured to:

measure the SRS based on the SRS resource set index to determine the SRS-RSRP measurement, wherein the measurement report is transmitted in an aperiodic measurement report, in a periodic measurement report, or in a semi-persistent measurement report.

6. The first UE of claim 4, wherein the SRS is included in the CMR configured to include a single SRS-resource or a single SRS resource set by the CSI-ResourceConfig parameter included in the CSI configuration.

7. The first UE of claim 1, wherein to measure the SRS to determine the SRS-RSRP measurement, the processor is configured to measure a latest SRS among a plurality of SRS that is not later than a CSI reference resource.

8. The first UE of claim 1, wherein the measurement report is a standalone report without carrying another reference measurement including: a RI (Rank Indicator), a Channel Quality Information (CQI), a Precoding Matrix Indicator (PMI), a Layer Indicator (LI), a CSI-RS Resource Indicator (CRI), or a synchronization signals (SS) and physical broadcast channel (PBCH) Resource Block Indicator (SSBRI).

9. The first UE of claim 1, wherein the CSI configuration further includes an adjustment of reception timing for measuring the SRS.

10. The first UE of claim 1, wherein the CSI configuration is received from the base station by a Radio Resource Control (RRC) message, a medium access control-control elements (MAC-CE), or Downlink Control Information (DCI).

11. The first UE of claim 1, wherein the CSI configuration further includes a priority among the measurement report, a link adaption (LA)-CSI report, or a beam measurement (BM)-CSI report.

12. The first UE of claim 1, wherein the CSI configuration further includes a SRS-RSRP processing time for the first UE to measure the SRS to determine the SRS-RSRP measurement and to transmit the measurement report using L1 to the base station.

13. The first UE of claim 1, wherein the processor is further configured to:

report a UE capability of the first UE to the base station to enable the base station to determine the CSI configuration based on the UE capability of the first UE.

14. The first UE of claim 13, wherein the UE capability includes a number of CSI Processing Units (CPUs) supported by the first UE supports.

15. A method for a first user equipment (UE), comprising:

determining a channel state information (CSI) configuration received from a base station in communication with the first UE, wherein the CSI configuration includes a CSI-ReportConfig parameter configuring a channel measurement resource (CMR) indicating a Sounding Reference Signal (SRS);

receiving, based on the CSI configuration, the SRS from a second UE in communication with the first UE;

measuring the SRS to determine an SRS-reference signal received power (SRS-RSRP) measurement;

generating a measurement report having the SRS-RSRP measurement to provide an indication of cross link interference (CLI) between the first UE and the second UE; and transmitting the measurement report to the base station using physical layer (L1).

16. The method of claim 15, wherein the CSI configuration further includes a subcarrier spacing (SCS) of the SRS and a serving cell identifier a cell that supports the first UE and the second UE.

17. The method of claim 15, wherein the measurement report is a standalone report without carrying an other reference measurement including: a RI (Rank Indicator), a Channel Quality Information (CQI), a Precoding Matrix Indicator (PMI), a Layer Indicator (LI), a CSI-RS Resource Indicator (CRI), or a synchronization signals (SS) and physical broadcast channel (PBCH) Resource Block Indicator (SSBRI).

18. The method of claim 15, wherein:

the CSI configuration further includes an adjustment of reception timing for measuring the SRS;

the CSI configuration is received from the base station by a Radio Resource Control (RRC) message, a medium access control-control elements (MAC-CE), or Downlink Control Information (DCI);

the CSI configuration further includes a priority among the measurement report, a link adaption (LA)-CSI report, or a beam measurement (BM)-CSI report; and the CSI configuration includes the CSI-ReportConfig parameter or a CSI-ResourceConfig parameter, and wherein one or multiple of SRS-ResourceSets can be configured by the CSI-ResourceConfig parameter.

19. A non-transitory computer-readable medium storing instructions that, when executed by a processor of a first user equipment (UE), cause the first UE to perform operations, the operations comprising:

determining a channel state information (CSI) configuration received from a base station in communication with the first UE, wherein the CSI configuration includes a CSI-ReportConfig parameter configuring a channel measurement resource (CMR) indicating a Sounding Reference Signal (SRS);

receiving, based on the CSI configuration, the CMR including the SRS from a second UE in communication with the first UE;

measuring the SRS to determine an SRS-reference signal received power (SRS-RSRP) measurement;

generating a measurement report having the SRS-RSRP measurement to provide an indication of cross link interference (CLI) between the first UE and the second UE; and transmitting the measurement report to the base station using physical layer (L1).

20. The non-transitory computer-readable medium of claim 19, wherein:

the CSI configuration further includes an adjustment of reception timing for measuring the SRS;

the CSI configuration is received from the base station by a Radio Resource Control (RRC) message, a medium access control-control elements (MAC-CE), or Downlink Control Information (DCI);

the CSI configuration further includes a priority among the measurement report, a link adaption (LA)-CSI report, or a beam measurement (BM)-CSI report; and the CSI configuration includes the CSI-ReportConfig parameter or a CSI-ResourceConfig parameter, and wherein one or multiple of SRS-ResourceSets can be configured by the CSI-ResourceConfig parameter.

* * * * *